United States Patent
Dravid et al.

(10) Patent No.: US 10,095,533 B1
(45) Date of Patent: Oct. 9, 2018

(54) METHOD AND APPARATUS FOR MONITORING AND AUTOMATICALLY RESERVING COMPUTER RESOURCES FOR OPERATING AN APPLICATION WITHIN A COMPUTER ENVIRONMENT

(75) Inventors: Vipin Dravid, Sunnyvale, CA (US); Anand Hariharan, Sunnyvale, CA (US)

(73) Assignee: Veritas Technologies LLC, Mountain View, CA (US)

( * ) Notice: Subject to any disclaimer, the term of this patent is extended or adjusted under 35 U.S.C. 154(b) by 2172 days.

(21) Appl. No.: 12/246,244

(22) Filed: Oct. 6, 2008

(51) Int. Cl.
*G06F 9/455* (2018.01)

(52) U.S. Cl.
CPC ................. *G06F 9/45558* (2013.01)

(58) Field of Classification Search
CPC .............. G06F 2009/45562; G06F 2009/45575
See application file for complete search history.

(56) References Cited

U.S. PATENT DOCUMENTS

| | | | |
|---|---|---|---|
| 7,356,817 B1 * | 4/2008 | Cota-Robles et al. ............ 718/1 |
| 8,453,197 B2 * | 5/2013 | Tai ............................ G06F 8/61 726/1 |
| 2004/0010788 A1 * | 1/2004 | Cota-Robles et al. ............ 718/1 |
| 2006/0085785 A1 * | 4/2006 | Garrett .............................. 718/1 |
| 2006/0195715 A1 * | 8/2006 | Herington ......................... 714/4 |
| 2007/0204266 A1 * | 8/2007 | Beaty et al. ....................... 718/1 |
| 2008/0028411 A1 * | 1/2008 | Cherkasova et al. .......... 718/104 |
| 2008/0082977 A1 * | 4/2008 | Araujo et al. ..................... 718/1 |
| 2008/0250415 A1 * | 10/2008 | Illikkal et al. ................ 718/103 |
| 2009/0016220 A1 * | 1/2009 | Uysal et al. ................... 370/232 |
| 2009/0031307 A1 * | 1/2009 | Chodroff et al. ............. 718/100 |
| 2009/0265707 A1 * | 10/2009 | Goodman et al. ................ 718/1 |
| 2010/0057913 A1 * | 3/2010 | DeHaan ................ G06F 15/173 709/226 |

* cited by examiner

*Primary Examiner* — Jacob Petranek
(74) *Attorney, Agent, or Firm* — Campbell Stephenson LLP

(57) ABSTRACT

A method and apparatus for monitoring and automatically reserving computing resources for operating an application within a computing environment is described. In one embodiment, the method for automatically resizing a virtual machine to optimize computer resource utilization includes monitoring a computing environment to detect an event, wherein the computing environment comprises a plurality of physical machines for operating at least one virtual machine and in response to an occurrence of the event within the computing environment, configuring the at least one virtual machine, wherein reserved portions of computer resources are allocated to a virtual machine of the at least one virtual machine for operating an application.

25 Claims, 5 Drawing Sheets

US 10,095,533 B1

METHOD AND APPARATUS FOR MONITORING AND AUTOMATICALLY RESERVING COMPUTER RESOURCES FOR OPERATING AN APPLICATION WITHIN A COMPUTER ENVIRONMENT

BACKGROUND OF THE INVENTION

Field of the Invention

Embodiments of the present invention generally relate to application management within a computing environment. More particularly, embodiments of the present invention relate to a method and apparatus for monitoring and automatically reserving computing resources for operating an application within a computing environment.

Description of the Related Art

In a typical computing environment, an organization may employ any number of technologies to process, store, protect, recover, produce and secure mission critical data. For example, the organization may employ one or more virtualization techniques to create one or more abstract computer resources (e.g., virtual machines, virtual applications, virtual desktops, virtual hardware devices and/or the like) from (physical) computer resources on one or more physical machines. Virtualization techniques are widely used for sharing various computer resources (e.g., networking components, storage devices, applications, operating systems, physical machines (servers) and/or the like) and for providing a number of services within the organization. For example, resource virtualization is the abstraction of various computer resources (e.g., servers, storage, network, memory, physical CPU and/or other computer resources) within the computing environment.

Virtual machines are abstract representations of physical machines. As such, several virtual machines may be running within a single physical machine. A virtualization layer exists between each virtual machine and local resources at the physical machine (e.g., a Hypervisor, a Virtual Machine Monitor (VMM) and/or the like). Accordingly, the virtual machines are limited to using the processors and the memory at the physical machine regardless of requirements of any application operating within the virtual machines. Furthermore, the virtual machines may use "virtual processors", which are fractions of processing power at the physical machine.

Computer resources (e.g., CPU, memory, disk I/O, network I/O and/or the like) belong to the physical machine that hosts the one or more virtual machines. Thus, the physical machine has a static capacity. Virtual machines share these computer resources with the other virtual machines hosted on the same physical machine. Depending upon the virtualization technology, the computer resources allocated to a virtual machine may be fixed or dynamic. Certain virtualization technologies (e.g., VMWARE and XEN) fail over and/or migrate a virtual machine from one physical machine to another physical machine.

Currently, applications operating within the virtual machine that require a particular computer resource load ascertain computer resource capacities of the physical machine at application start time. Furthermore, virtualization technologies permit users to specify computer resource requirements at a virtual machine level. Subsequently, one or more portions of available computer resource are allocated to one or more virtual machines that operate the applications. Often, the computer resource capacities are not optimal or simply insufficient for operating the applications. For example, the computer resource capacities are below the user-specified computer resource requirements. Furthermore, high priority applications may not operate properly or at all because lower priority applications consume a considerable portion of the computer resources. For example, a highly available server cluster should ensure that the high priority applications are maintained during a heavy workload Therefore, there is a need in the art for a method and apparatus for monitoring and automatically reserving computing resources for operating an application to facilitate optimal computer resource utilization within a computing environment.

SUMMARY OF THE INVENTION

Embodiments of the present invention generally comprise a method and apparatus for monitoring and automatically reserving computing resources for operating an application within a computing environment. In one embodiment, a method for automatically resizing a virtual machine to optimize computer resource utilization includes monitoring a computing environment to detect an event, wherein the computing environment comprises a plurality of physical machines for operating at least one virtual machine and in response to an occurrence of the event within the computing environment, configuring the at least one virtual machine, wherein reserved portions of computer resources are allocated to a virtual machine of the at least one virtual machine for operating an application

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
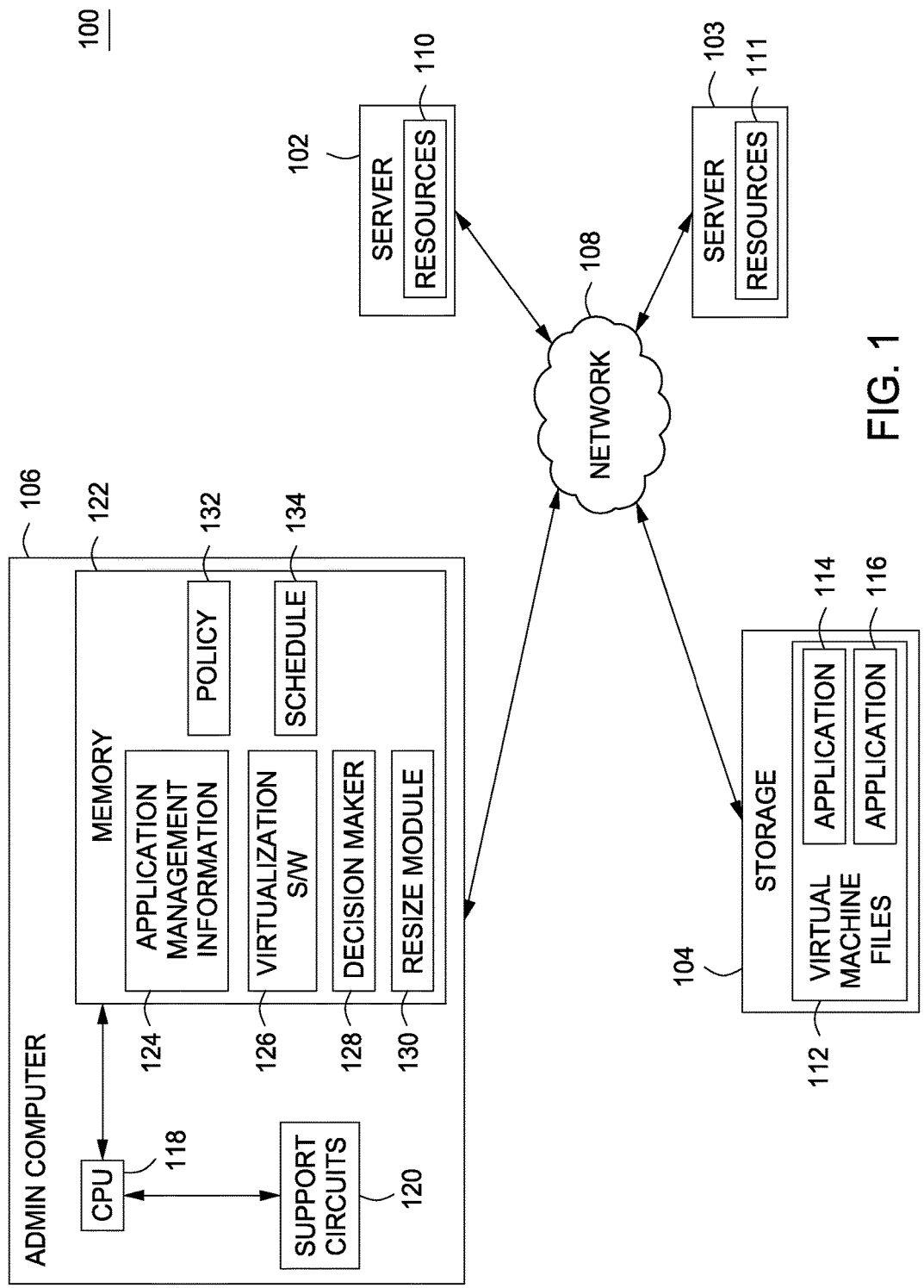
FIG. 1 is a block diagram of a system for managing optimal utilization of resources for operating one or more applications according to one or more embodiments of the present invention.

FIG. 1 is a block diagram of a system 100 for managing optimal utilization of resources for operating one or more applications according to one or more embodiments of the present invention. The system 100 includes a server 102, a server 103, storage 104 and an admin computer 106 where each is coupled to each other through a network 108 according to one embodiment.

The server 102 and the server 103 are types of computing devices (e.g., a desktop, a laptop, a Personal Desk Assistant (PDA) and/or the like), such as those generally known in the art. Furthermore, the server 102 and the server 103 include resources 110 and resources 111, respectively. The resources 110 and the resources 111 may be computer resources, such as memory, processors (e.g., CPU), storage input/output, network input/output and/or the like. As explained further below, a portion of the resources 110 and/or the resources 111 may be assigned to one or more service groups for operating the one or more applications.

In one embodiment, the server 102 and the server 103 form a portion of a computing environment (e.g., a server cluster). It is appreciated that such a computing environment may further include a number of computers (e.g., servers), networking and storage components, virtualization technologies and/or protocols in accordance with various embodiments of the present invention. For example, the computing environment may be a highly available server cluster that uses virtual machines to operate the one or more applications and/or provide virtual desktops to one or more users.

The storage 104 is a subsystem and may generally include various components (i.e., hardware and software) that are configured to manage storage resources within a computing environment. The storage 104 includes one or more data storage devices (e.g., hard disk drives, optical drives, magnetic tape drives and/or the like) and storage management software that provides an interface (e.g., Integrated Drive Electronics/AT Attachment (IDE/ATA), Small Computer Systems Interface (SCSI) and/or the like) to the one or more data storage devices for the computing environment, such as server 102, the server 103 and the admin computer 106. The storage 104 facilitates permanent storage of critical computer data, such as virtual machine files 112 (e.g., a .VMX file, a .VMDK file, a .VHD file and/or the like).

The virtual machine files 112 are utilized (e.g., mounted by virtualization software) to generate one or more virtual machines. In one embodiment, the server 102 and/or the server 103 access the virtual machine files 112 to produce the one or more virtual machines. Accordingly, a memory state for each of the one or more virtual machines is stored on the server 102 and/or the server 103. Hence, the decision maker 128 initiates migration of the memory states of the one or more virtual machines from the server 102 to the server 103 and vice versa. In addition, the one or more virtual machines may utilize one or more portions of the resources 110 and/or the resources on the server 102 and/or the server 103, respectively. Furthermore, the virtual machine files 112 include various software applications, such as an application 114 and an application 116. In one embodiment, the application 114 and the application 116 are binaries that may be installed and run on one or more virtual machines.

The admin computer 106 is a type of computing device (e.g., a laptop, a desktop, a Personal Desk Assistant (PDA), a tablet, a mobile phone and/or the like) that comprises a central processing unit (CPU) 118, various support circuits 120 and a memory 122. The CPU 118 may comprise one or more commercially available microprocessors or microcontrollers that facilitate data processing and storage. Various support circuits 120 facilitate operation of the CPU 118 and may include clock circuits, buses, power supplies, input/output circuits and/or the like. The memory 122 includes a read only memory, random access memory, disk drive storage, optical storage, removable storage, and the like. The memory 122 includes various data, such as application management information 124, a policy 132 and a schedule 134. The memory 122 includes various software packages, such as virtualization software 126, a decision maker 128 and a resize module 130.

The network 108 comprises a communication system that connects computers by wire, cable, fiber optic, and/or wireless links facilitated by various types of well-known network elements, such as hubs, switches, routers, and the like. The network 108 may employ various well-known protocols to communicate information amongst the network resources. For example, the network 108 may be part of the Internet or intranet using various communications infrastructure such as Ethernet, WiFi, WiMax, General Packet Radio Service (GPRS), and the like.

The application management information 124 includes various values in terms of computer resources that are related to one or more applications running within the computing environment. The various values may be normalized to facilitate the automatic reservation and optimal utilization of the computer resources, such as the resources 110 and the resources 111. In one embodiment, the application management information 124 indicates one or more load values, capacity values and/or priority values for the one or more applications, such as the application 114 and the application 116. A load value may denote a portion of the computer resources to be allocated to and/or consumed by a particular application. A capacity value may denote a total amount of the computer resources within a physical machine or dedicated to a virtual machine. A priority value may indicate a rank or importance of the particular application with respect to the remaining applications of the one or more applications running within the computing environment.

For example, the server 102 may be a physical machine in a server cluster that includes four gigabytes RAM and four CPUs and is assigned a capacity value of 400 units (e.g., memory and CPU capacity). Generally, a unit denotes an amount of one or more computer resources, such as the resources 110. Similarly, the server 103 may also be a physical machine in the server cluster. However, the server 103 includes 2 gigabytes RAM and two CPUs and is assigned a capacity value of 200 units. The application 114 may be a critical application for the computing environment and is assigned a highest priority value (e.g., a priority value of one). Furthermore, the application 114 (e.g., a service group associated with the application 114) may have a load value of 150 units. The application 116 may be a less critical application and assigned a lower priority value that the application 114 (e.g., a priority value of three). In addition, the application 116 may have a load value of 300 units.

In one embodiment, the schedule 134 may indicate that the application 114 is to start. A virtual machine running within the server 102 that only operates the application 116 consumes 300 units or seventy-five percent of the capacity value (i.e., an available capacity value of 100 units). Notably, the application 114 cannot operate optimally on the server 102 along with the application 116. Hence, the application 116 is to be stopped in order to release the 300 units back to the server 102 so that 150 units may be allocated to the application 114. This is performed to ensure that a higher priority application operates optimally during a heavy workload at the server 102 even at the expense of a lower priority application. In operation, the virtual machine is offlined (e.g., powered off and/or dismounted) and/or migrated to the server 103. Subsequently, the server 102 configures another virtual machine with 150 or more units and commences operation of the application 114.

In another embodiment, the server 102 fails and the application 114 fails over to a virtual machine (i.e., an idle virtual machine) on the server 103. In one embodiment, a memory state of the virtual machine is migrated to the server 103 from the server 102. As such, the virtual machine on the server 103 is allocated 150 units to optimally operate the application 114. For example, 150 units are reserved for an application service group associated with the application 114 and brought online at the server 103. As another example, the 150 units are reserved for the virtual machine (e.g., VFrame) on the server 103 (e.g., Pframe) when a state is changed to "online" or "running". Naturally, when the state changes to "faulted" or "exited", the 150 units are released back to the server 103.

In yet another embodiment, another virtual machine (e.g., a portion of the virtual machine files 112) that is scheduled to operate the application 114 is mounted by the server 103. In order to operate the application 114 in an optimal manner, the application 114 requires 150 units of the resources 111 or seventy-five percent of the capacity. Thus, the server 103 retains an available capacity value of 50 units.

According to various embodiments of the present invention, the virtualization software 126 includes software code that provides a virtualization layer (e.g., a hypervisor) between one or more virtual machines and local computer resources (e.g., memory, physical CPU and/or the like) of one or more physical machine in the computing environment, such as the server 110 and the server 112. For example, the virtualization layer multiplexes the resources 110 to a virtual machine running in the server 102. As such, the virtualization layer generated by the virtualization software 126 facilitates the necessary "virtual machine" abstraction. In one or more embodiments, the virtualization software 126 is configured to manage various events within the computing environment, such as a failover caused by a failure or a fault (e.g., an instruction fault raised by an application).

The decision maker 128 is configured to monitor the computer environment in order to detect one or more events that affect computer resource utilization amongst one or more virtual machines. According to one embodiment, the one or more events may include one or more failures, such as server failures, instruction faults, network failures, storage device failures and/or the like. In one embodiment, the decision maker 128 monitors a computer health associated with the computing environment to detect the one or more failures. In another embodiment, the one or more events may include scheduled application events, such as starting and/or stopping an application.

In yet another embodiment, the one or more events may initiate computer resource reservation. For example, if a virtual machine (VFrame) changes a state to "online", memory and/or CPU resource reservations are recalculated. The memory and/or CPU reservations may be less than or equal to a capacity value for the virtual machine. As another example, if memory and/or CPU reservations associated with an application service group are modified, then the memory and/or CPU reservations are recalculated. In yet another example, the memory and/or CPU reservations are recalculated when a capacity value for the virtual machine is modified.

In one or more embodiments, the decision maker 128 includes software code for managing a workload for one or more applications within the computing environment. For example, the decision maker 128 monitors a state of the application 114 and the application 116 and determines whether the one or more virtual machines are to be configured to optimize the computer resource utilization. As another example, the decision maker 128 migrates a virtual machine (e.g., a virtual machine memory state) amongst a plurality of physical machines (i.e., servers) in order to facilitate optimal computer resource utilization by one or more applications.

The policy 132 includes information that may be used by the decision maker 128 to manage a workload associated with the application 114 and the application 116. In one embodiment, the policy 132 may define one or more attributes that specify reserved portions of the resources 110 and/or the resources 111. In one embodiment, the policy 132 determines whether computer resource reservations are computed. For example, the policy 132 may indicate that the computer resource reservations are implemented when a virtual frame changes state to "online" or when an application service group comes online.

The schedule 134 defines the workload for one or more applications within the computing environment. In one embodiment, the schedule 134 includes one or more application events within the computing environment. For example, the schedule 134 indicates an order in which the application 114 and/or the application 116 start and stop to operate on one or more particular virtual machines. As such, the schedule 134 may be used by the decision maker 128 (e.g., or any other application management component) to detect one or more occurrences of one or more events.

The resize module 130 includes software code for configuring one or more virtual machines within the computing environment in order to achieve optimal computer resource utilization by one or more applications, such as the application 114 and/or the application 116. In one embodiment, the resize module 130 determines computer resource reservations based on the application management information 124 (e.g., loads, capacities and/or priorities). For example, the resize module 130 computes CPU and/or memory resource reservations. The computer resource reservations identify one or more portions computer resources to be allocated to the application 114 and/or the application 116. As such, the resize module 130 reserves one or more portions of the computer resource in accordance with the computer resource reservations.

In another embodiment, the resize module 130 defines CPU and memory reservation attributes for the one or more virtual machines through a virtualization layer provided by the virtualization software 126 as explained further below. For example, the resize module 130 may modify a configuration file (e.g., a VMX file) within the virtual machine files 112 that is associated with a particular virtual machine. As another example, the resize module 130 may dynamically allocate the computer resources to the particular virtual machine through the virtualization layer at runtime. In addition, the CPU and memory reservation attributes may be modified through a clustering solution (e.g., VERITAS Cluster Server) and/or application management software (e.g., VERITAS Application Director)

According to one embodiment, the system 100 includes a server cluster (e.g., VERITAS Cluster Server (VCS) associated with loosely coupled, shared server and storage infrastructure environments). As mentioned above, the server 102 and the server 103 may form a portion of such a server cluster. Furthermore, the server cluster may employ one or more application service groups (e.g., VCS service groups) to manage performance of the application 114 and/or the application 116. In one embodiment, one or more portions of the resources 110 and/or the resources 111 may be assigned to the one or more application service groups.

Generally, an application service group provides various computer resources for operating a software application (e.g., the application 114 of FIG. 1), such as memory resources, CPU resources, application services, a virtual machine, a virtual machine file system (VMFS), replication resources, storage resources and virtual network resources. In one embodiment, the application service group includes one or more hardware and/or software resources of the computing environment that are reserved for a virtual machine to enable optimal operation of the application 114 and/or the application 116. Furthermore, the application service groups facilitate control over the one or more reserved hardware and software resources as a single unit.

In order to achieve high availability for the application 114 and/or the application 116, the one or more hardware and/or software resources of the application service group may be reserved to enable optimal computer resource utilization and/or ensure that higher priority applications continue operating despite computer resource requirements of lower priority applications. Upon an occurrence of an event (e.g., a fault), the one or more reserved hardware and software resources may be allocated (e.g., failed over) to a virtual machine individually or the service group may fails over to the virtual machine in entirety.

Furthermore, the server cluster may employ a centralized application control solution for end-to-end application management automation and high availability (e.g., VERITAS Application Director (VAD)) for the server cluster. In one embodiment, a VAD server cluster develops application service groups (i.e., logical multitier, cross-node application models) within the server cluster along with the application management information 124 (e.g., priorities), the schedule 134 (e.g., application startup/shutdown ordering) and one or more application dependencies. Moreover, the VAD server cluster implements the policy 132 (e.g., a dynamic capacity of an application service group at start up) and/or the schedule 134 (e.g., a shutdown/startup order). As such, the application 114 and/or the application 116 may be started up on or failed over to any server in the VAD server cluster subject to the policy 132. In addition, the VAD server cluster leverages application dependency discovery technologies provided by VERITAS Configuration Manager to determine the one or more dependencies for the application service groups.

In one embodiment, the VAD server cluster includes software code for performing various application management functions within the server cluster, such the decision maker 128 and the resize module 130. In operation, the decision maker 128 monitors the application 114 and/or the application 116 within the VAD server cluster. If an event (e.g., a fault) occurs within the VAD server cluster, the decision maker 128 executes the resize module 130 in order to automatically reserve memory and/or CPU resources for operating the application 114 and/or the application 116 in an optimal manner.

As explained further below, the VAD server cluster utilizes software code to create objects (e.g., internal objects) for managing applications, virtual machines that run the applications and/or physical machines that host the virtual machines. In one embodiment, VFrames and PFrames are frame objects created to represent the virtual machines and the physical machines, respectively. For example, a VFrame may be configured to run on a PFrame. Since a capacity of the VFrame depends upon a capacity of the PFrame, the VFrame may be dynamically resized (e.g., expanded or shrunken) to any capacity value that is lower than or equal to the capacity of the PFrame.

In one embodiment, a virtualization abstraction layer (VAL) models the virtual machines and the physical machines as group objects and system objects, respectively. For example, a system object is created when a PFrame is added to the VAD server cluster. As another example, a group object (e.g., an application service group) is created when a VFrame is added to the VAD server cluster. As explained below, values for capacities, loads and/or priorities associated with the PFrame and/or the VFrame affect capacities, loads and/or priorities of any associated system object and/or group object.

Figure 2:
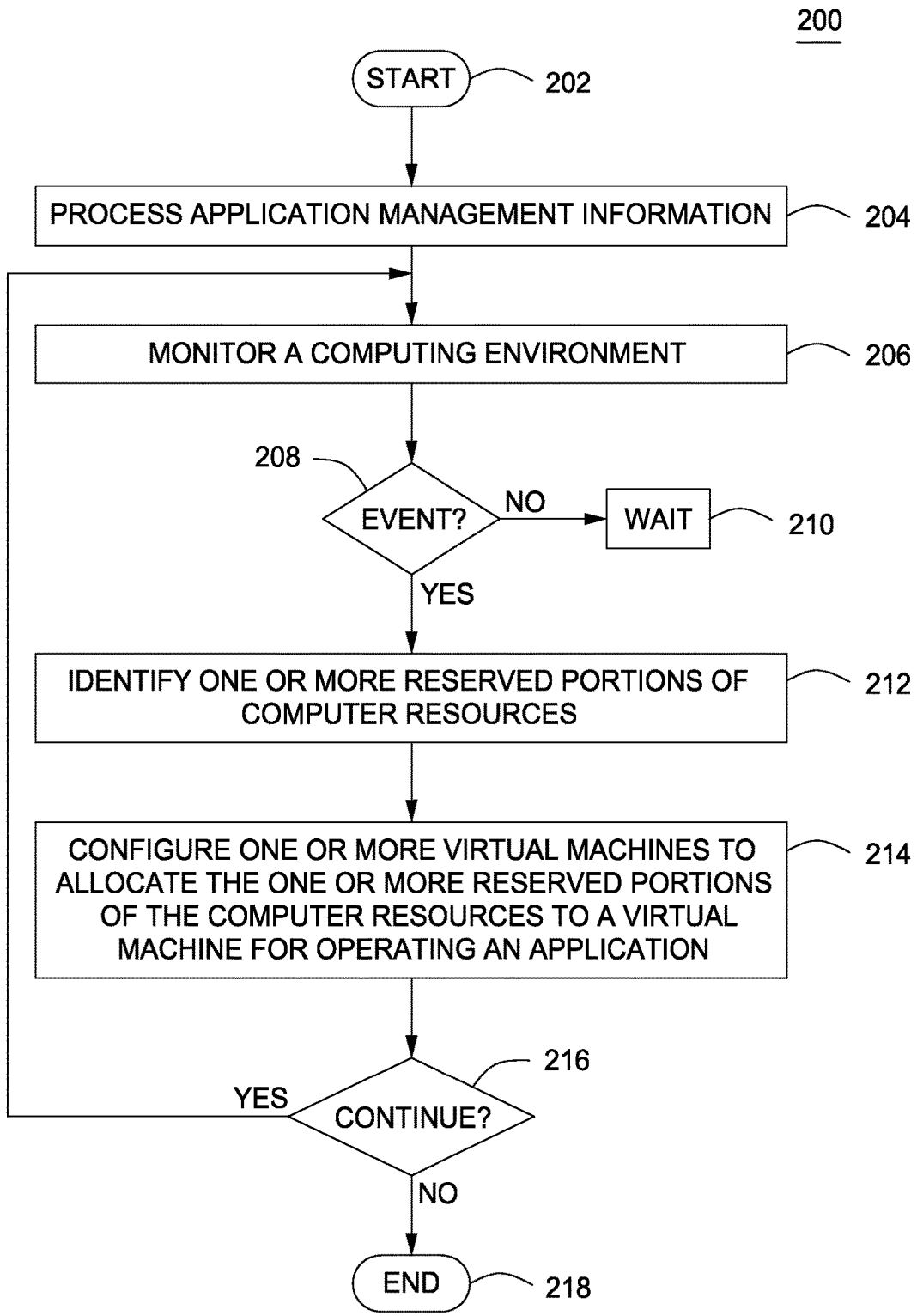
FIG. 2 is a flow diagram of a method for configuring one or more virtual machines to enable optimal computer resource utilization for an application according to one or more embodiments of the present invention.

FIG. 2 is a flow diagram of a method 200 for configuring one or more virtual machines to enable optimal computer resource utilization for an application according to one or more embodiments of the present invention. The method 200 starts at step 202 and proceeds to step 204.

At step 204, application management information is processed. At step 206, a computer environment is monitoring for an occurrence of one or more events. At step 208, a determination is made as to whether there is an occurrence of an event within the computing environment. If there is no such occurrence, the method 200 proceeds to step 210 where the method 200 waits until an occurrence of the event is detected. If there is such an occurrence of the event, then the method 200 proceeds to step 212. At step 212, identify one or more reserved portions of computer resources. At step 214, the one or more virtual machines are configured to allocate the one or more reserved portions of the computer resources to a virtual machine for operating the application. At step 216, a determination is made as to whether the computing environment is to continue to be monitored. If the computing environment is to continue to be monitored, the method 200 returns to step 206. If the computing environment is no longer being monitored, the method 200 proceeds to step 218. At step 218, the method 200 ends.

Figure 3:
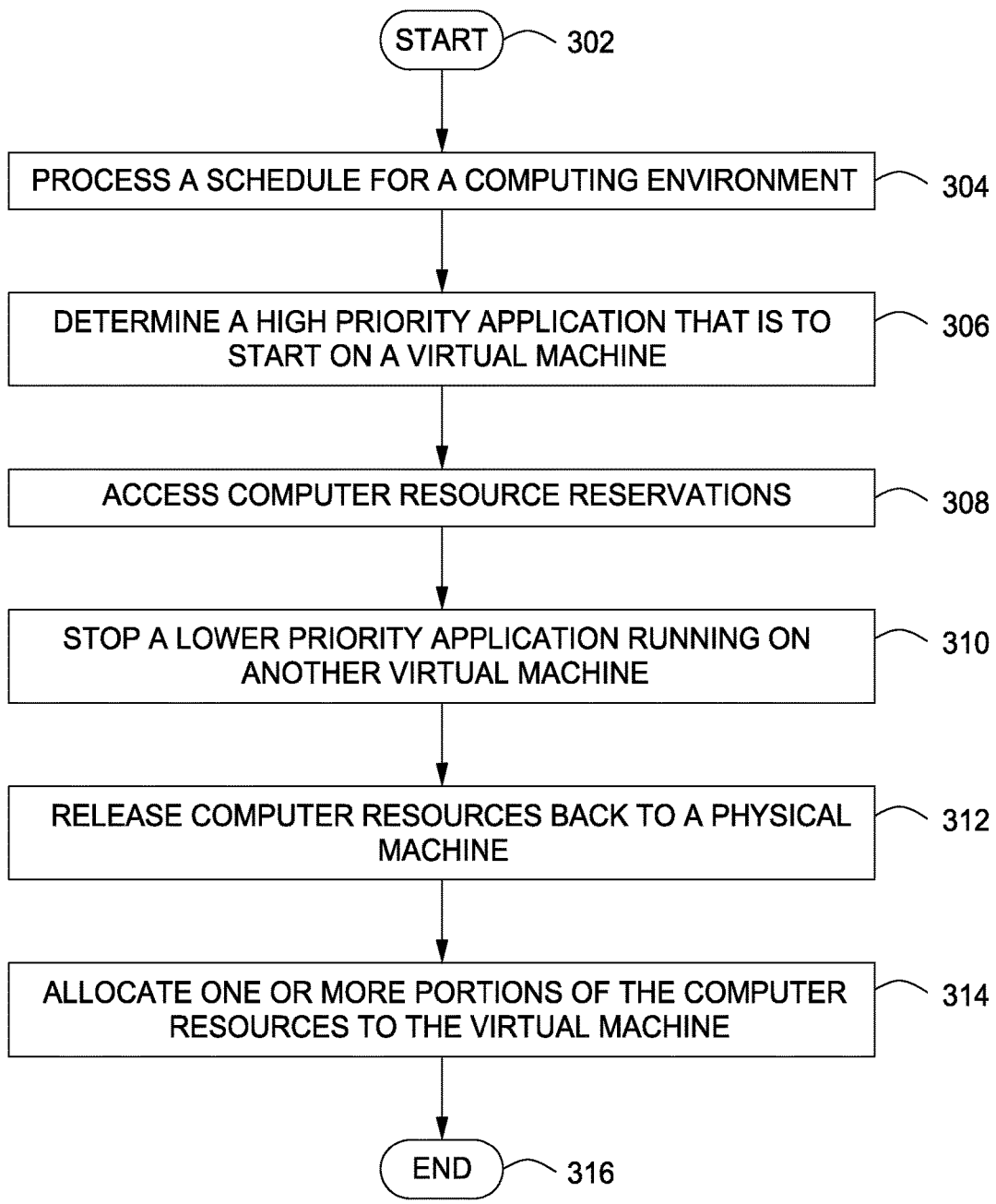
FIG. 3 is a flow diagram of a method for automatically reserving computer resources for an application in response to an event according to one or more embodiments of the present invention.

FIG. 3 is a flow diagram of a method 300 for automatically reserving one or more portions of computer resources for an application in response to an event according to one or more embodiments of the present invention. The method 300 starts at step 302 and proceeds to step 304.

At step 304, a schedule for a computing environment is processed. In one embodiment, the schedule indicates an order in which the applications are run within the computing environment. For example, the schedule indicates a high priority application that is to start on a virtual machine. At step 306, the high priority application that is to start on the virtual machine is determined. At step 308, computer resource reservations for the virtual machine are accessed. At step 310, a lower priority application operating on another virtual machine is stopped. For example, computer resources assigned to the lower priority application are to be freed in order to operate the higher priority application. At step 312, computer resources are released back to a physical machine that runs the virtual machine and the another virtual machine. At step 314, one or more portions of the computer resources are allocated to the virtual machine in accordance with the computer resource reservations. At step 316, the method 300 ends.

Figure 4:
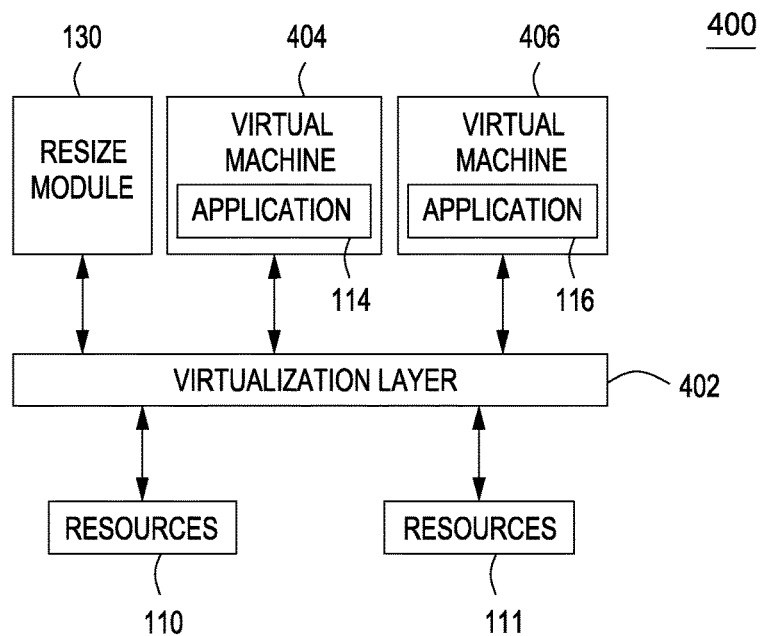
FIG. 4 is a functional block diagram that illustrates a virtualization architecture employed by a server cluster according to one or more embodiments of the present invention.

FIG. 4 is a functional block diagram that illustrates a virtualization architecture 400 employed by a server cluster according to one or more embodiments of the present invention. The virtualization architecture 400 includes a virtualization layer 402 that creates an abstraction of the resources 110 and the resources 111 in the form of a virtual machine 404 and a virtual machine 406. Accordingly, operations (e.g., storage and/or file system operations) associated with the application 114 and the application 116 running within the virtual machine 404 and the virtual machine 406, respectively, are translated by the virtualization layer 402. Subsequently, the translated operations are performed on the resources 110 and/or the resources 111. For example, processes for the application 114 and/or the application 116 access reserved CPU and memory resources to process, modify and/or store data.

According to one or more embodiments, the resize module 130 cooperates with the virtualization layer 402 to automatically reserve one or more portions of the resources 110 and/or the resources 111 for the application 114 and the application 116. Upon an occurrence of an event within the server cluster, the resize module 130 allocates the reserved one or more portions of the resources 110 and/or the resources 111 to the virtual machine 404 and/or the virtual machine 406 in accordance with a policy (e.g., the policy 132 of FIG. 1).

Figure 5:
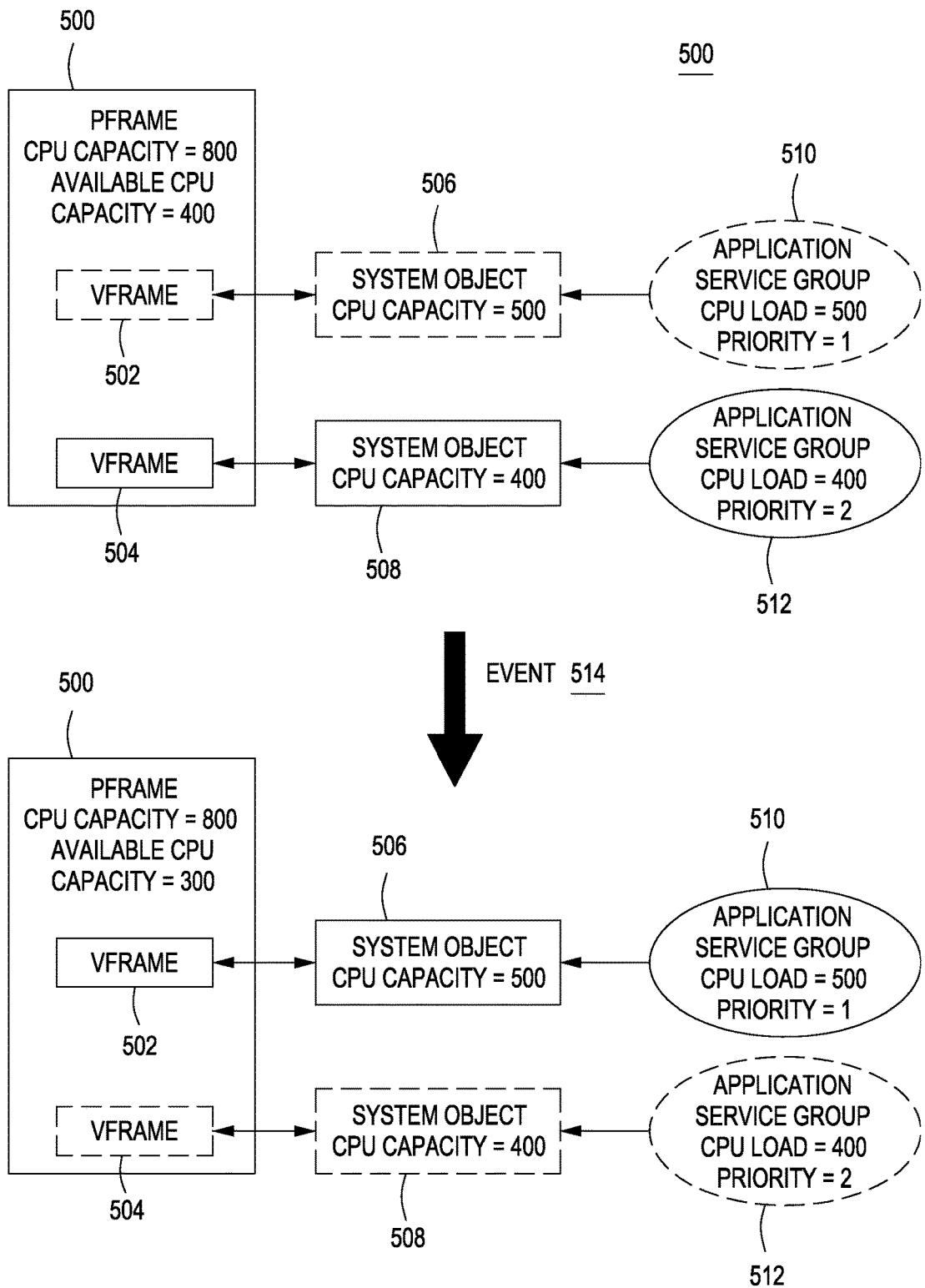
FIG. 5 is a functional block diagram of a PFrame that illustrates optimal computer resource utilization upon an occurrence of an event according to one or more embodiments of the present invention.

FIG. 5 is a functional block diagram of a PFrame 500 that illustrates optimal computer resource utilization upon an occurrence of an event according to one or more embodiments of the present invention. In one or more embodiments, a virtual machine is dedicated to an application and applicable to various virtualization technologies (e.g., VMware, XEN and/or the like). Hence, each VFrame has only one application service group configured to run and/or the application service group has only one system in its system list. It is appreciated that in other embodiments of the present invention, a particular VFrame may be associated with more than one application service group.

The PFrame 500 may be a physical frame object that represents a physical machine (e.g., the server 102) in a server cluster. The PFrame 502 includes various computer resources (e.g., memory and/or CPU resources) for operating one or more virtual frame objects that represent one or more virtual machines, such as VFrame 502 and VFrame 504. Furthermore, the VFrame 502 and/or the VFrame 504 are associated (i.e., linked) with a system object 506 and/or a system object 508, respectively. The system object 506 and/or the system object 508 are system objects in which an application service group 510 and/or an application service group 512 are configured to run, respectively.

As depicted, an event 514 occurs within the server cluster and initiates resizing of the VFrame 502 and/or the VFrame 504 to achieve optimal CPU resource utilization. Before the event 514, only the VFrame 504 is online and running within the PFrame 500. In one embodiment, the CPU capacity of the VFrame 504 may be ascertained from the capacity of the PFrame 500 as the VFrame 504 comes online. The CPU capacity of the VFrame 504 is utilized to determine CPU resource reservations. As such, 400 units are reserved as the application service group 512 came online and/or the VFrame 504 came online and/or moved to a "running" state.

Hence, the application service group 512 is now online with a priority of two and consumes a CPU load of 400 units or fifty percent of a CPU capacity of 800 units for the PFrame 500. As a result, an available CPU capacity of the PFrame 500 is 400 units.

In response to the occurrence of event 514, the VFrame 504 is resized to allocate CPU resources to the VFrame 502 and facilitate optimal CPU utilization for a priority one application service group. In one or more embodiment, the CPU resources allocated to the VFrame 502 may be less than or equal to a CPU load for the application service group 510. For example, the VFrame 504 is offlined, which releases the 400 units back to the PFrame 500 and increases the available CPU capacity to 800 units to accommodate CPU resource reservations associated with the VFrame 502. As such, 500 units are allocated to the VFrame 502 to operate a higher priority application at the expense of a lower priority application running within the VFrame 504.

Optionally, if the server cluster includes another PFrame to represent another physical machine (e.g., a server) which may host the VFrame 504 and includes a sufficient available CPU capacity, the VFrame 504 fails over to the another PFrame according to one embodiment. For example, the VFrame 504 (e.g., a memory state of a virtual machine) is migrated to another PFrame. If not, an internal object (e.g., an associated application service group, a system object and/or the like) associated with the VFrame 504 remains in a queue and is to be brought online when the CPU capacity of the PFrame 500 becomes sufficient for the load of the application service group 512 (e.g., optimal).

Alternatively, the server cluster may employ different virtualization technologies (e.g., SOLARIS Logical Domain (LDOM), ZONES and/or the like) to automatically reserve and allocate computer resources for optimal operation of an application. In one alternative embodiment, the physical machine associated with the PFrame 500 may host multiple application service groups where each application service groups utilizes a system list spanning multiple system objects (i.e., VAD system objects). Furthermore, some of the different virtualization technologies do not support failover/migration of virtual machines to other physical machines in the server cluster. In addition, the policy does not indicate that a VFrame CPU load is to be reserved (e.g., grabbed) on the PFrame 500 until the application service group actually comes online, In one embodiment, the VFrame 502 and the VFrame 504 are running on the PFrame 500. The application service group 512 is online but the application service group 510 is offline. The PFrame 500 currently has an available capacity of 400. Subsequently, if the application service group 510 is brought online, the capacity of the VFrame 502 increases by the load of 500 units for the application service group 510. Since the VFrame 502 has a higher priority, VFrame 504 is to be offlined in order to make room for the VFrame 502. The application service group 512 associated with the VFrame 504 remains in a queue and is to be brought online when the CPU capacity of the PFrame 500 becomes sufficient (e.g., optimal or near optimal CPU capacity based on CPU resource reservations) for the load of the application service group 512. In another embodiment, the application service group 512 remains in a queue unless the application service group 512 fails over to another physical machine in the server cluster or the VFrame 502 stops.

Generally, a capacity of a physical frame (PFrame) is a static normalized capacity value, which may be assigned by an administrator or determined in accordance with a policy. The capacity values assigned to the PFrame are assigned the capacity of any associated system object. However, a capacity value for a virtual frame indicates available computer resources for one or more applications. The portions of the available computer resources that are to be reserved for the virtual machine are allocated from a host physical machine (i.e., a load that a virtual machine instance exerts on the physical machine). Furthermore, the capacity of the virtual frame is assigned as the load of an associated application service group (e.g., a group object).

Generally, a priority of a virtual frame (VFrame) is a maximum priority among one or more application service groups that are assigned to run on a system object associated with the virtual frame. In case the virtual frame is not associated with a system object, a user may assign a priority for the virtual frame. By default, a frame has a minimum priority (e.g., five). If an application service group is associated with the virtual frame (e.g., an internal group object), then the application service group inherits the priority of the virtual frame as well.

A capacity of a frame object denotes the computer resources that may be allocated to one or more applications configured to run on the frame object. In an embodiment where the frame object is a PFrame, the one or more applications are one or more virtual machine instances. If the frame object is a VFrame, the capacity may be determined based on one or more loads of one or more applications that are configured to run on a system object associated with the VFrame. For example, the capacity may be computed when the one or more application service groups are online. On the other hand, the capacity may be computed when the VFrame changes to a "running" state.

Following are the calculations used for computing capacity values. A capacity of a PFrame may be a value based on the computer resources within a physical machine represented by the PFrame. For example, the capacity may be assigned to the PFrame by the administrator. As another example, the capacity of the PFrame may be specified in a policy. Furthermore, the capacity may be a static value since there is a strong likelihood that the computer resources within the physical machine are not to be modified. For example, Available Capacity=Capacity−(Sum of capacities of all currently hosted virtual frames).

For a VFrame associated with a system object, a capacity is a sum of each and every load of all the applications and an available capacity is equal to the capacity minus a sum of loads of all application service groups online at the system object plus the available capacity of the associated PFrame. For the application service group associated with the VFrame, a load is equal to the capacity of the associated VFrame. For a system object (e.g., a VAD system object), a capacity is equal to a total load of the configured application service groups plus the available capacity on the PFrame and an available capacity is equal to a capacity minus a total load of all online application service groups.

In one embodiment, a resize module (e.g., the resize module 130 of Figure) defines one or more attributes associated with a virtual frame and one or more associated service groups (e.g., internal group objects) to support policy-based decision making and optimal computer resource utilization within the server cluster (e.g., a VAL for VCS One server cluster). The one or more attributes may specify computer resource reservations for the virtual frame (e.g., memory and/or CPU resource reservations). In one embodiment, the one or more attributes may also specify application management information (e.g., the application management information 124, such as values for load, priority and/or capacity of frame objects and group objects).

As explained further below, the resize module may define a CPUReservationPct attribute (e.g., a fraction or percentage of total CPU resources available to virtual machines) and a MEMReservationPct attribute (e.g., a fraction or percentage of total memory resources available to virtual machines) for the virtual frame.

In addition, the resize module reserves and allocates one or more portions of the computer resources to facilitate optimal computer resource utilization, guarantee available CPU and/or memory capacities and/or maintain operation of higher priority applications during a heavy workload in accordance with one or more attributes. For example, a Boolean GrabStatic attribute determines whether the resize module allocates the virtual frame with a capacity of computer resources that are required (e.g., reserved) for configured application service groups when the virtual frame comes online. The GrabStatic attribute may also determine whether the resize module allocates the capacity of the computer resources to the virtual frame when one or more individual application service groups come online. Furthermore, the capacity of the computer resources is allocated from an available capacity of a physical frame that runs the virtual frame. The GrabStatic attribute may also determine whether the resize module allocates the computer resources when the one or more individual application service groups are configured to a system object linked to the virtual frame. As explained further below, the resize module may recalculate computer resource reservations (e.g., CPU and/or memory resource reservations) when the computer resource capacities (e.g., CPU and/or memory capacities) are modified and/or allocated to the virtual frame according to one or more embodiments.

In addition to the values for load and capacity, virtualization technologies allocate resources to a virtual machine through a myriad of methods. For example, a policy may indicate that if a virtual frame is not linked to a VAD system object, then the resize module reserves computer resources when the virtual frame changes to a "running" state and releases the reserved computer resources when the virtual frame goes to "faulted" or "exited" state. However, if the virtual frame is linked to a VAD system object, the computer resource reservations are computed when an application service group configured to run on the physical frame comes online. Similarly, the reserved computer resources are released when the application service group becomes offline.

Figure 6:
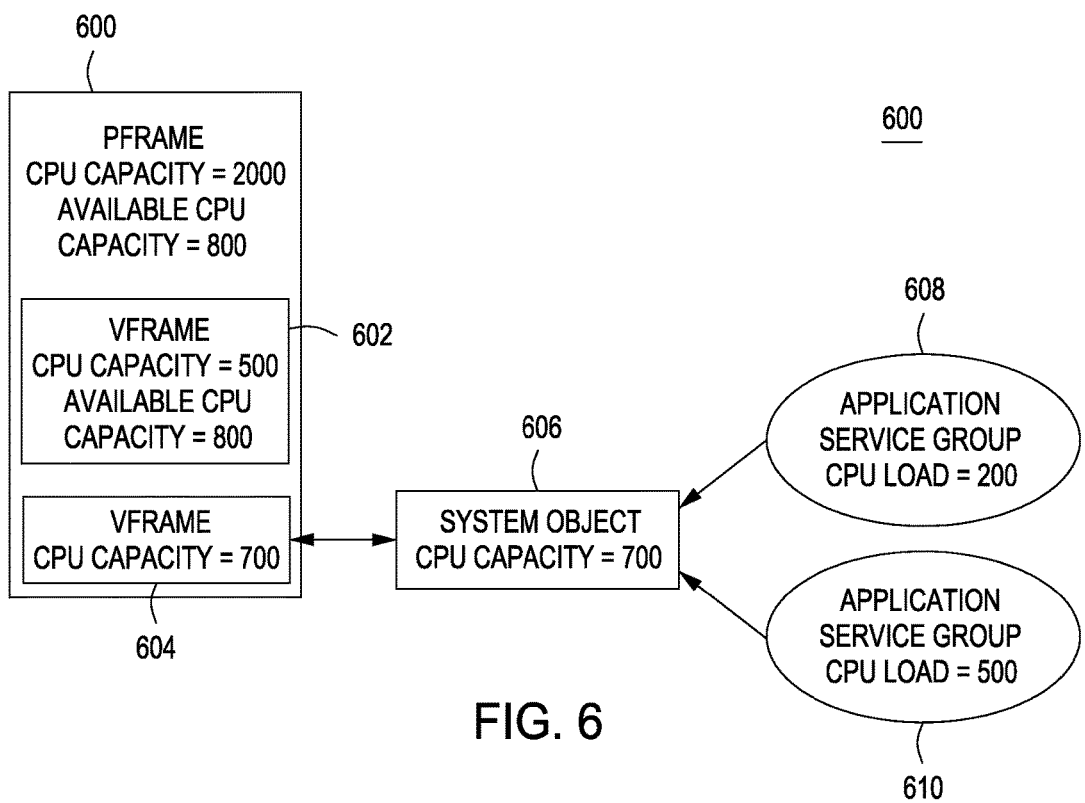
FIG. 6 is a functional block diagram of a PFrame that illustrates automatic computer resource reservation based on capacity values and load values according to one or more embodiments of the present invention.

FIG. 6 is a functional block diagram of a PFrame 600 that illustrates automatic computer resource reservation based on capacity values and load values according to one or more embodiments of the present invention. In certain virtualization technologies (e.g., VMWARE supported with VAL for VCS One 2.0) allows administrators to specify computer resource reservations for a virtual machine on a physical machine (e.g., an ESX server). Such reserved computer resources are dedicated to the virtual machine even when the physical machine is under a heavy workload. In one embodiment, a resize module (e.g., the resize module 130 of FIG. 1) cooperates with the certain virtualization technologies to determine and reserve CPU and memory resources for the virtual machine (e.g., a VFrame) based on application management information (e.g., priority, load and/or capacity values) specified for the physical machine (e.g., a PFrame) and the virtual machine.

In one or more embodiments for calculating computer resource reservations, normalized load and capacity values are required to be specified for the PFrame 600 and the application service groups configured on a VAD system 606 (e.g., VCS One System) linked to a VFrame 604. Based on memory and CPU resource reservations specified for a capacity of the PFrame 600 and a load of the application service group, the CPU and memory resource reservations for the VFrame 604 are determined.

In one embodiment, a CPU resource reservation calculation formula for the VFrame 604 may be as follows:

$$CPU \text{ resource reservation} = \frac{CPU \text{ load on the } Vframe\ 604}{CPU \text{ capacity of the } Pframe\ 600} * \text{Max available } CPU \text{ capacity}$$

Generally, a CPU load on a VFrame is equal to a total CPU load of each and every online application service group on the VFrame. Furthermore, a maximum available CPU capacity for a PFrame is equal to a product of a MaxCPU attribute for the PFrame and a percentage of CPU resources to be considered for reservation as specified in CPUReservationPct attribute. The MaxCPU attribute denotes total CPU resources available on the PFrame. The CPUReservationPct attribute specifies a fraction of the MaxCPU attribute to be considered while calculate CPU resource reservations. Such attributes may be discovered through a virtualization abstraction layer (VAL). Furthermore, such attributes may be defined in a policy by the resize module (e.g., a VCS one system).

With respect to FIG. 6, the CPU load on the VFrame 604 is equal to a sum of a CPU load for the application service group 608 and a CPU load of the application service group 610. Hence, the CPU load on the VFrame 604 is equal to the sum of 200 units+500 units or 700 units. In addition, a maximum available CPU capacity for the PFrame 600 is equal to a product of a MaxCPU attribute and a CPUReservationPct attribute. As shown in FIG. 6, the CPU capacity of the PFrame 600 is 2000 units. In one embodiment, if the CPUReservationPct attribute is one hundred percent, then all 2000 units are available to the VFrame 602 and/or the VFrame 604. Hence, the CPU resource reservation is equal to (700 units/2000 units)*2000 units, which results in 700 units. Accordingly, the CPU resource reservation is an optimal utilization of CPU resources because 700 units is equal to the CPU load for the VFrame 604.

In another embodiment, if the CPUReservationPct attribute is less than one hundred percent, then a portion of the 2000 units are available to the VFrame 602 and/or the VFrame 604. For example, the CPUReservationPct attribute may be eighty percent (80%) and the MaxCPU attribute may be 2000 units. Therefore, the maximum available CPU capacity for the PFrame 600 is 80% of 2000 units, which results in 1600 units. Consequently, the CPU resource reservation on the VFrame 604 is equal to a product of (700 units/2000 units)*1600 units, which results in 560 units. Even though 560 units is less than the CPU load on the VFrame 604, the CPU resource reservation is optimal given the restriction to 80% of the maximum CPU capacity.

Similarly, a memory resource reservation calculation formula for the VFrame 604 may be as follows:

$$MCPU \text{ resource reservation} = \frac{CPU \text{ load on the } Vframe\ 604}{CPU \text{ capacity of the } Pframe\ 600} * \text{Max available } CPU \text{ capacity}$$

Generally, a memory load on a VFrame is equal to a total memory load of each and every online application service group on the VFrame. In addition, the maximum available memory capacity is equal to a product of a VMMemorySize attribute for a PFrame and a MEMReservationPct attribute. The VMMemorySize attribute denotes total memory resources available on the PFrame. The MEMReservationPct attribute denotes a percentage of total memory resources to be considered for calculating the memory resource reservation.

In one or more embodiments, the CPU and memory resource reservations for the VFrame 604 are recalculated and reserved on the server cluster. For example, the CPU and memory resource reservations may be recalculated when the VFrame 604 changes state to online on the PFrame 600. As another example, the CPU and memory resource reservations may be recalculated when the application management information (e.g., load, capacity and/or priority values) for the application service group 608 and/or the application service group 610 are modified. In yet another example, the CPU and memory resource reservations may be recalculated when the capacity of the VFrame 602 (e.g., a VFrame that is not linked to a system object, such as a VCS One system object) is modified. Modifications to load, capacity and/or priority values may alter workload management within the server cluster.

While the foregoing is directed to embodiments of the present invention, other and further embodiments of the invention may be devised without departing from the basic scope thereof, and the scope thereof is determined by the claims that follow.

The invention claimed is:
1. A method comprising:
monitoring a computing environment to detect one or more events within the computing environment, wherein
the one or more events are associated with characteristics of computer resources provided by one or more physical machines within the computing environment,
a plurality of units are assigned to the computer resources, and
the plurality of units specify a combination of a plurality of load values, a plurality of capacity values, and a plurality of priority values;
accessing a schedule to determine a start time for starting an application within the computing environment, wherein
the schedule defines a workload for the application within the computing environment;
before the start time, configuring one or more virtual machines, wherein configuring the one or more virtual machines comprises:
determining whether the one or more virtual machines are configured to optimize the computer resources within the computing environment; and
based on the determining,
releasing one or more units of the plurality of units assigned to the computer resources, and
reserving and allocating one or more load values of the plurality of load values, one or more capacity values of the plurality of capacity values, or one or more priority values of the plurality of priority values supported by the one or more units of the plurality of units assigned to the computer resources and released to a virtual machine of the one or more virtual machines for operating the application; and after the start time has elapsed,
determining whether the virtual machine is continuing to operate within the computing environment and whether a physical machine of the one or more physical machines comprises processing capacity to execute the application,
designating the application to be placed in a queue if the physical machine does not comprise the processing capacity to execute the application, and
in response to a determination that the virtual machine is not continuing to operate and that the physical machine comprises the processing capacity to execute the application, removing the application from the queue and releasing a corresponding portion of the one or more load values, the one or more capacity values, or the one or more priority values allocated to the virtual machine to the physical machine for allocation to another virtual machine of the one or more virtual machines for operating the application.

2. The method of claim 1, wherein
configuring the one or more virtual machines further comprises allocating the one or more capacity values of the computer resources to a virtual frame based on an available capacity of a physical frame that hosts the virtual frame.

3. The method of claim 1, wherein
configuring the one or more virtual machines further comprises determining computer resource reservations based on the one or more capacity values associated with the virtual machine and the one or more load values associated with an application service group, wherein
the application service group is configured to run in a system object.

4. The method of claim 1, wherein
configuring the one or more virtual machines further comprises computing CPU resource reservations and memory resource reservations.

5. The method of claim 1, wherein
configuring the one or more virtual machines further comprises stopping another application operating on the virtual machine of the one or more virtual machines.

6. The method of claim 5, wherein
configuring the one or more virtual machines further comprises
deallocating the one or more load values, the one or more priority values, or the one or more capacity values supported by the one or more units of the plurality of units assigned to the computer resources and reserved for and released to the virtual machine for the another application.

7. The method of claim 6, wherein
configuring the one or more virtual machines further comprises
allocating the one or more load values, the one or more priority values, or the one or more capacity values supported by the one or more units of the plurality of units assigned to previously deallocated to the virtual machine of the one or more virtual machines for operating the application, wherein
the application has a higher priority than the another application, and
the higher priority is determined based on the one or more priority values.

8. The method of claim 6, further comprising:
starting the another application on another virtual machine of the one or more virtual machines.

9. The method of claim 8, further comprising:
generating a virtual frame for the another virtual machine and a physical frame for
another physical machine of the plurality of physical machines, wherein
the virtual frame is configured to run on the physical frame,
the virtual frame is a group object, and
the physical frame is a system object; and
migrating the another virtual machine to the another physical machine of the plurality of physical machines.

10. The method of claim 1, wherein
configuring the one or more virtual machines further comprises stopping another application operating on another virtual machine of the one or more virtual machines.

11. The method of claim 1, wherein
configuring the one or more virtual machines further comprises
defining an attribute to reserve the one or more load values, the one or more priority values, or the one or more capacity values supported by the one or more units of the plurality of units assigned to the computer resources and released to a virtual machine of the one or more virtual machines for operating the application, wherein
the attribute is associated with application management within a server cluster, and
the attribute facilitates control over one or more hardware resources and one or more software resources associated with the computer resources within the server cluster as a single unit of the plurality of units.

12. The method of claim 1, wherein
the schedule defining the workload for the application within the computing environment, further comprises:
accessing the plurality of units assigned to the computer resources during the monitoring of the computing environment to detect the one or more events within the computer environment, wherein
the plurality of units assigned to the computer resources are related to the application within the computing environment.

13. The method of claim 12, wherein
the one or more load values indicates a portion of the computer resources to be allocated to and to be consumed by the application,
the one or more capacity values indicates a total amount of the computer resources dedicated to the virtual machine, and
the one or more priority values indicates a rank of the application with respect to other applications running within the computing environment.

14. The method of claim 1, further comprising:
monitoring the computing environment for occurrence of the one or more events within the computing environment, wherein
the one or more events are application events comprise one or more hardware failures or one or more application requests within the computing environment; and determining whether there is occurrence of the event within the computing environment before configuring the one or more virtual machines, wherein
the determining is performed by accessing the schedule.

15. The method of claim 1, wherein
the configuring is based on the workload for the application defined by the schedule.

16. The method of claim 1, wherein
the one or more events comprise a server failure, an instruction fault, a network failure, a storage device failure, an application start time, or an application stop time.

17. The method of claim 1, wherein
the one or more events are associated with the characteristics of the computer resources are related to a plurality of hardware and software components within the computing environment.

18. The method of claim 9, further comprising:
assigning a first capacity value of the plurality of capacity values to the physical frame and a second capacity value of the plurality of capacity values to the virtual frame, wherein
the first capacity value is a static normalized capacity value, and
the second capacity value is a load of the group object, wherein the group object is an application service group.

19. The method of claim 9, further comprising:
assigning a priority value of the plurality of priority values to the virtual frame,
wherein
the priority value is a maximum priority value among one or more application service groups that are assigned to run on the system object associated with the virtual frame; and
inheriting the priority value if an application service group of the one or more application service groups are associated with the virtual frame.

20. The method of claim 9, further comprising:
determining that the virtual frame is associated with the system object; and
calculating a capacity value of the plurality of capacity values for the virtual frame based on at least a first set of load values of the plurality of load values associated with a plurality of applications executing in the computing environment, and a second set of load values of the plurality of load values associated with one or more application service groups that are online at the system object within the computing environment.

21. An apparatus comprising:
a decision maker for
monitoring a computing environment to detect one or more events within the computing environment, wherein
the one or more events are associated with characteristics of computer resources provided by one or more physical machines within the computing environment,
a plurality of units are assigned to the computer resources, and
the plurality of units specify a combination of a plurality of load values, a plurality of capacity values, and a plurality of priority values, and
monitoring a schedule to detect when an application is to start running,
wherein
the schedule defines a workload for the application within the computing environment;
a resize module for allocating portions of the computer resources within the computing environment before the application is started, the allocating portions comprising:
determining whether one or more virtual machines are configured to optimize the computer resources within the computing environment; and
based on the determining,
releasing one or more units of the plurality of units assigned to the computer resources, and
reserving and allocating one or more load values of the plurality of load values, one or more capacity values of the plurality of capacity values, or one or more priority values of the plurality of priority values supported by the one or more units of the plurality of units assigned to the computer resources and released to a virtual machine of the one or more virtual machines for operating the application; and
a release module for
determining whether the virtual machine is continuing to operate within the computing environment and whether a physical machine of the one or more physical machines comprises processing capacity to execute the application,
designating the application to be placed in a queue if the physical machine does not comprise the processing capacity to execute the application, and
in response to a determination that the virtual machine is not continuing to operate and that the physical machine comprises the processing capacity to execute the application, removing the application from the queue and releasing a corresponding portion of the one or more load values, the one or more capacity values, or the one or more priority values allocated to the virtual machine to the physical machine for allocation to another virtual machine of the one or more virtual machines for operating the application.

22. The apparatus of claim 21, wherein
the resize module is configured to reserve the computer resources based on at least one capacity associated with at least one virtual frame and at least one load associated with at least one application service group.

23. The apparatus of claim 22, wherein
the resize module is configured to
offline another virtual machine that implements another application based on a priority value of the plurality of priority values,
release computer resources allocated to the another application,
allocate computer resources that were allocated to the another application to the virtual machine for operating the application, wherein
the application has a higher priority than the another application, and
the higher priority is based on the priority value.

24. The apparatus of claim 21, wherein
the configuring is based on the workload for the application defined by the schedule.

25. A non-transitory computer readable storage medium comprising program instructions executable to:
monitor a computing environment to detect one or more events within the computing environment, wherein the one or more events are associated with characteristics of computer resources provided by one or more physical machines within the computing environment, and a plurality of units are assigned to the computer resources provided by the one or more physical machines;

access a schedule to determine a start time for starting an application within the computing environment;

before the start time, configure one or more virtual machines, comprising:

releasing one or more units of the plurality of units assigned to the computer resources, and allocating the one or more units to a virtual machine of the one or more virtual machines for operating the application; and after the start time has elapsed, determining whether the virtual machine is continuing to operate within the computing environment and whether a physical machine of the one or more physical machines comprises processing capacity to execute the application, designating the application to be placed in a queue if the physical machine does not comprise the processing capacity to execute the application, and in response to a determination that the virtual machine is not continuing to operate and that the physical machine comprises the processing capacity to execute the application, removing the application from the queue and releasing a corresponding portion of the one or more load values, the one or more capacity values, or the one or more priority values allocated to the virtual machine to the physical machine for allocation to another virtual machine of the one or more virtual machines for operating the application.

\* \* \* \* \*